US010118238B2

(12) United States Patent
Kazda et al.

(10) Patent No.: US 10,118,238 B2
(45) Date of Patent: Nov. 6, 2018

(54) BLADE FOR A RECIPROCATING SAW

(71) Applicant: MILWAUKEE ELECTRIC TOOL CORPORATION, Brookfield, WI (US)

(72) Inventors: Austin J. Kazda, Wauwatosa, WI (US); Ryan J. Malloy, Milwaukee, WI (US); Robert W. Butzen, Colgate, WI (US); Andrew J. Schulz, Slinger, WI (US); Roger D. Neitzell, Palmyra, WI (US); Courtney D. McCool, Menomonee Falls, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 15/588,292

(22) Filed: May 5, 2017

(65) Prior Publication Data
US 2017/0239738 A1     Aug. 24, 2017

Related U.S. Application Data

(63) Continuation of application No. 13/783,003, filed on Mar. 1, 2013, now Pat. No. 9,643,267.
(Continued)

(51) Int. Cl.
*B27B 33/02*     (2006.01)
*B23D 61/12*     (2006.01)

(52) U.S. Cl.
CPC ......... *B23D 61/128* (2013.01); *B23D 61/121* (2013.01); *B23D 61/123* (2013.01)

(58) Field of Classification Search
CPC .. B23D 61/123; B23D 61/127; B23D 61/128; Y10T 83/9319; Y10T 83/9454
(Continued)

(56) References Cited

U.S. PATENT DOCUMENTS 304,715 A    9/1884  Emerson
511,473 A    12/1893 Szekely
(Continued)

FOREIGN PATENT DOCUMENTS

DE    3838844 A1    5/1990
DE    4316454 A1    11/1994
(Continued)

OTHER PUBLICATIONS

"How-To's for all Band Saw Blades" The Olson Saw Company, Betherl, CT © 2001.
(Continued)

*Primary Examiner* — Omar Flores Sanchez
(74) *Attorney, Agent, or Firm* — Michael Best & Friedrich LLP

(57) ABSTRACT

A blade for use with a reciprocating saw includes an attachment portion configured to couple to the reciprocating saw and a body extending from the attachment portion. The body includes a first portion, a tip portion, and a second portion extending from the first portion to the tip portion. The first portion has a height between about 0.625 inches and about 1.0 inches and the second portion has a height between about 0.18 inches and about 0.25 inches. The blade also includes a blunt tip formed at a distal end of the tip portion. An overall length of the blade is between about 2.4 inches and about 3.25 inches, measured from a proximal edge of the attachment portion to the blunt tip. The blade also includes a plurality of teeth arranged along the second portion and defining a cutting edge.

25 Claims, 7 Drawing Sheets

Related U.S. Application Data

(60) Provisional application No. 61/707,332, filed on Sep. 28, 2012, provisional application No. 61/676,613, filed on Jul. 27, 2012, provisional application No. 61/674,132, filed on Jul. 20, 2012, provisional application No. 61/605,389, filed on Mar. 1, 2012.

(58) Field of Classification Search
USPC .......... 83/697, 835, 846, 838; 30/279.2, 355
See application file for complete search history.

(56) References Cited

U.S. PATENT DOCUMENTS

| | | |
|---|---|---|
| 522,749 A | 7/1894 | Bedell |
| 709,857 A | 9/1902 | Anderson |
| 770,094 A | 9/1904 | McGill |
| 807,227 A | 12/1905 | Wuest |
| 865,348 A | 9/1907 | Allison |
| 942,920 A | 12/1909 | Martin |
| 2,256,847 A | 9/1941 | Osenberg |
| D170,202 S | 8/1953 | Knapp |
| 2,781,578 A | 2/1957 | Guilfoyle |
| 2,962,798 A | 12/1960 | Gaskins |
| 3,005,478 A | 10/1961 | Laviano |
| 3,028,889 A | 4/1962 | McCarty |
| 3,033,251 A | 5/1962 | Atkinson |
| 3,213,910 A | 10/1965 | Sweet |
| 3,262,475 A | 7/1966 | Sweet |
| 3,285,136 A | 11/1966 | Wezel |
| 3,395,414 A | 8/1968 | Malin |
| 3,572,409 A | 3/1971 | Hoffman |
| 3,596,525 A | 8/1971 | Niesz |
| 3,680,610 A | 8/1972 | Lindgren |
| 3,727,258 A | 4/1973 | Brueck |
| 3,837,024 A | 9/1974 | Saunders |
| 3,905,105 A | 9/1975 | Tuke |
| 3,914,906 A | 10/1975 | Barnes |
| 3,977,289 A | 8/1976 | Tuke |
| 4,083,112 A | 4/1978 | Palm |
| 4,131,996 A | 1/1979 | Janke |
| 4,271,592 A | 6/1981 | Hoptner |
| 4,339,977 A | 7/1982 | Miller |
| 4,365,397 A | 12/1982 | Felpel |
| 4,458,421 A | 7/1984 | Lew |
| 4,661,195 A | 4/1987 | Hopson |
| 4,787,146 A | 11/1988 | Gaskins |
| 4,802,396 A | 2/1989 | Kuklinski |
| 4,870,757 A | 10/1989 | Kirkpatrick |
| 4,984,369 A | 1/1991 | Flint |
| 5,009,012 A | 4/1991 | Martinez |
| 5,042,592 A | 8/1991 | Fisher |
| 5,095,623 A | 3/1992 | Williams |
| 5,097,578 A | 3/1992 | Jandl |
| 5,224,231 A | 7/1993 | Nacar |
| 5,265,340 A | 11/1993 | Nitz |
| 5,295,426 A | 3/1994 | Planchon |
| 5,303,471 A | 4/1994 | Liberatoscioli |
| 5,353,465 A | 10/1994 | Pierce |
| D356,020 S | 3/1995 | Costa |
| 5,398,360 A | 3/1995 | Alexander |
| 5,448,833 A | 9/1995 | Coon |
| 5,480,507 A | 1/1996 | Arnold |
| 5,513,709 A | 5/1996 | Fisher |
| 5,517,889 A | 5/1996 | Logan |
| 5,615,746 A | 4/1997 | Chu |
| 5,640,772 A | 6/1997 | Roeker |
| 5,658,193 A | 8/1997 | McCambridge |
| 5,678,292 A | 10/1997 | Kimbel |
| 5,687,484 A | 11/1997 | Hahn |
| 5,697,835 A | 12/1997 | Nitz |
| 5,809,657 A | 9/1998 | Mortensen |
| 5,829,082 A | 11/1998 | Moreira |
| 5,833,014 A | 11/1998 | Dunn |
| D402,516 S | 12/1998 | Okada |
| 5,842,278 A | 12/1998 | Gmeilbauer |
| 5,901,451 A | 5/1999 | Nakayama |
| 5,901,951 A | 5/1999 | Yamaguchi |
| 5,918,525 A | 7/1999 | Schramm |
| 5,957,765 A | 9/1999 | Kimbel |
| 5,964,039 A | 10/1999 | Mizoguchi |
| 5,979,058 A | 11/1999 | Henke |
| 6,021,573 A | 2/2000 | Kikuchi |
| 6,059,475 A | 5/2000 | Jafarmadar |
| D427,865 S | 7/2000 | Mills |
| 6,120,363 A | 9/2000 | Dunn |
| 6,125,544 A | 10/2000 | Eriksson |
| 6,145,426 A | 11/2000 | Ward |
| 6,149,510 A | 11/2000 | Romagnoli |
| D442,053 S | 5/2001 | Jimenez |
| 6,237,179 B1 | 5/2001 | Balceiro |
| 6,260,825 B1 | 7/2001 | Willis |
| 6,283,843 B1 | 9/2001 | Romagnoli |
| D448,634 S | 10/2001 | Hickman |
| 6,357,122 B2 | 3/2002 | Bachta |
| 6,393,701 B1 | 5/2002 | Fuchs |
| 6,401,585 B1 | 6/2002 | Morgan |
| 6,442,781 B1 | 9/2002 | Chen |
| 6,481,691 B1 | 11/2002 | Irving |
| 6,497,046 B1 | 12/2002 | Bardeen |
| D479,107 S | 9/2003 | Rack |
| D479,447 S | 9/2003 | Rack |
| D482,945 S | 12/2003 | Grolimund |
| 6,668,463 B2 | 12/2003 | Dewberry |
| D484,759 S | 1/2004 | Rack |
| D485,140 S | 1/2004 | Rack |
| D485,141 S | 1/2004 | Rack |
| D485,142 S | 1/2004 | Rack |
| D485,479 S | 1/2004 | Rack |
| 6,678,959 B1 | 1/2004 | Phillip |
| 6,751,875 B2 | 6/2004 | Jones |
| 6,754,967 B2 | 6/2004 | Lovell |
| D493,340 S | 7/2004 | Pyatt |
| 6,782,781 B2 | 8/2004 | Rack |
| 6,829,973 B1 | 12/2004 | Yang |
| 6,871,405 B2 | 3/2005 | Reale |
| 6,886,261 B2 | 5/2005 | Haut |
| 6,887,139 B2 | 5/2005 | Jennette |
| 6,938,531 B2 | 9/2005 | Yoshimizu |
| 7,036,415 B2 | 5/2006 | Tsujimoto |
| D527,233 S | 8/2006 | Burke, III |
| 7,127,979 B2 | 10/2006 | Kocher |
| D534,401 S | 1/2007 | Duffin |
| 7,232,112 B2 | 6/2007 | Foster |
| 7,251,895 B2 | 8/2007 | Kurtz |
| 7,269,867 B2 | 9/2007 | Karlstedt |
| D551,923 S | 10/2007 | Ammann |
| 7,285,038 B1 | 10/2007 | Jioia |
| D554,452 S | 11/2007 | Ammann |
| D555,444 S | 11/2007 | Ammann |
| D565,369 S | 4/2008 | Dawson |
| 7,451,677 B2 | 11/2008 | Souza |
| 7,487,704 B2 | 2/2009 | Souza |
| 7,631,584 B2 | 4/2009 | Quinn |
| 7,540,091 B2 | 6/2009 | Fladgard |
| 7,600,458 B2 | 10/2009 | Hampton |
| 7,661,195 B1 | 2/2010 | Wood |
| 7,765,631 B2 | 8/2010 | Fisher |
| 7,779,500 B1 | 8/2010 | Greer |
| 7,818,887 B2 | 10/2010 | Saegesser |
| 7,984,914 B1 | 7/2011 | Paulsen |
| 8,365,419 B2 | 2/2013 | Bernardi |
| 8,689,667 B2 | 4/2014 | Butzen |
| 8,926,410 B2 | 1/2015 | Kalomeris |
| 2001/0039738 A1 | 11/2001 | Bachta |
| 2002/0029484 A1 | 3/2002 | Takeuchi |
| 2002/0144411 A1 | 10/2002 | Brooks |
| 2003/0014836 A1 | 1/2003 | Kocher |
| 2003/0014869 A1 | 1/2003 | Rack |
| 2003/0177646 A1 | 9/2003 | Watanabe |
| 2004/0163264 A1 | 8/2004 | Simonz |
| 2004/0187320 A1 | 9/2004 | Haut |
| 2004/0221405 A1 | 11/2004 | Manfredi |
| 2005/0199117 A1 | 9/2005 | Quinn |
| 2005/0211023 A1 | 9/2005 | Kalo |

(56) References Cited

U.S. PATENT DOCUMENTS

| | | |
|---|---|---|
| 2005/0235799 A1 | 10/2005 | Hampton |
| 2005/0262702 A1 | 12/2005 | Hawthorn |
| 2005/0262709 A1 | 12/2005 | Polk |
| 2006/0016315 A1 | 1/2006 | Zorich |
| 2006/0037199 A1 | 2/2006 | Alpert |
| 2006/0086218 A1 | 4/2006 | Quinn |
| 2006/0112566 A1 | 6/2006 | Peterson |
| 2006/0137498 A1 | 6/2006 | Bowling |
| 2006/0254044 A1 | 11/2006 | Hao |
| 2007/0033812 A1 | 2/2007 | Kimura |
| 2007/0157476 A1 | 7/2007 | Hunt |
| 2008/0017009 A1 | 1/2008 | Setliff |
| 2008/0115367 A1 | 5/2008 | Glynn |
| 2008/0235955 A1 | 10/2008 | Rosso |
| 2008/0276470 A1 | 11/2008 | Ritter |
| 2009/0004997 A1 | 1/2009 | Allen |
| 2009/0044679 A1 | 2/2009 | Souza |
| 2009/0049973 A1 | 2/2009 | Huffer |
| 2009/0119930 A1 | 5/2009 | Collins |
| 2009/0261539 A1 | 10/2009 | Paulsen |
| 2009/0320299 A1 | 12/2009 | Kuhn |
| 2010/0011594 A1 | 1/2010 | Wysk |
| 2010/0218389 A1 | 9/2010 | Kalomeris |
| 2010/0300719 A1 | 12/2010 | Fisher |
| 2011/0179930 A1 | 7/2011 | Brown |
| 2011/0259168 A1 | 10/2011 | Butzen |
| 2011/0314680 A1 | 12/2011 | Zhang |
| 2012/0042765 A1 | 2/2012 | Kazda |
| 2012/0047659 A1 | 3/2012 | Murphy |
| 2012/0073148 A1 | 3/2012 | Sergyeyenko |
| 2012/0090443 A1 | 4/2012 | Butzen |
| 2012/0204353 A1 | 8/2012 | Chu |
| 2012/0255180 A1 | 10/2012 | Powers |
| 2012/0299254 A1 | 11/2012 | Wanstrath |
| 2013/0174701 A1 | 7/2013 | Elliston |
| 2013/0227844 A1 | 9/2013 | Kazda |
| 2013/0228059 A1 | 9/2013 | Kazda |
| 2013/0239418 A1 | 9/2013 | Kehoe |
| 2013/0255016 A1 | 10/2013 | Berney |

FOREIGN PATENT DOCUMENTS

| | | |
|---|---|---|
| EP | 0779123 A2 | 6/1997 |
| GB | 2439291 A | 12/2007 |

OTHER PUBLICATIONS

2" Carbide Grit Hole Saw 49-56-0444, Milwaukee Electric Tool Company, Retrieved from Internet on Feb. 29, 2012 <URL: http://www.milwaukeetool.com/accessories/drilling/49-56-0444>.

Dewalt Folding Jab Saw and Rasp, known at least as early as Feb. 10, 2012, 1 page.

Reciprocating Saw Blade, SAF-T-KUT, Retrieved from Internet on Jun. 28, 2011 <URL: http://www.saf-t-kut.com/products/reciprocating-saw-blade/>.

Reciprocating Saw Blades, WILPU Sageblatter, Retrieved from Internet on Feb. 26, 2013 <URL: http://wilpu.com/en/products/reciprocating-saw-blades/>.

United States Patent Office Action for U.S. Appl. No. 13/782,995 dated Dec. 1, 2016 (12 pages).

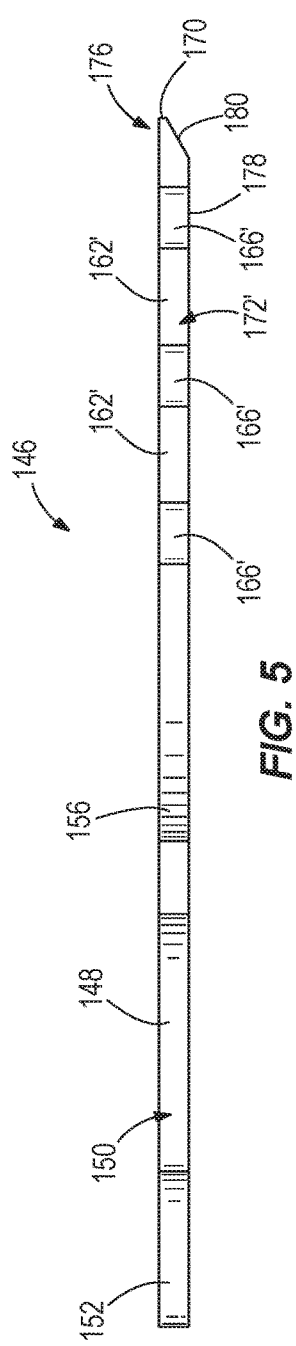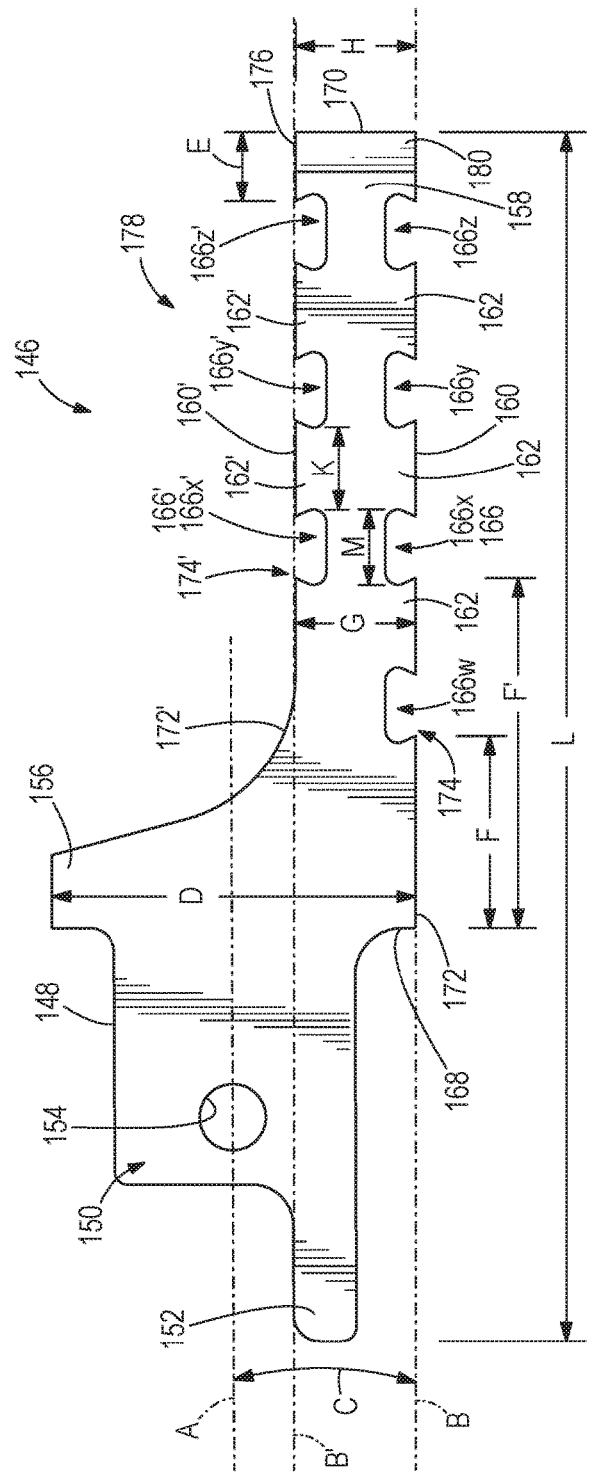
FIG. 5
FIG. 6A

BLADE FOR A RECIPROCATING SAW

CROSS-REFERENCE TO RELATED APPLICATIONS

This application is a continuation of U.S. Non-Provisional patent application Ser. No. 13/783,003 filed on Mar. 1, 2013, now U.S. Pat. No. 9,643,267, which claims priority to U.S. Provisional Patent Application No. 61/605,389 filed on Mar. 1, 2012, U.S. Provisional Patent Application No. 61/674,132 filed on Jul. 20, 2012, U.S. Provisional Patent Application No. 61/676,613 filed on Jul. 27, 2012, and U.S. Provisional Patent Application No. 61/707,332 filed on Sep. 28, 2012, the entire contents of all of which are incorporated herein by reference.

FIELD OF THE INVENTION

The present invention relates to blades for power tools, and more particularly to a blade for a reciprocating saw.

BACKGROUND OF THE INVENTION

Reciprocating tools, such as reciprocating saws, typically include removable blades to allow for replacement of worn or damaged blades.

SUMMARY

The invention provides, in one aspect, a blade for use with a reciprocating saw. The blade includes an attachment portion configured to couple to the reciprocating saw, and a body extending from the attachment portion. The body includes a first portion, a tip portion, and a second portion extending from the first portion to the tip portion. The first portion has a height between about 0.625 inches and about 1.0 inches and the second portion has a height between about 0.18 inches and about 0.25 inches. A blunt tip is formed at a distal end of the tip portion. The blade includes an overall length between about 2.4 inches and about 3.25 inches, measured from a proximal edge of the attachment portion to the blunt tip. A plurality of teeth is arranged along the second portion and defines a cutting edge.

The invention provides, in another aspect, a blade for use with a reciprocating saw, the blade having an attachment portion configured to couple to the reciprocating saw and a body extending from the attachment portion. The body includes a first portion, a tip portion, and a second portion extending from the first portion to the tip portion. The second portion has a height less than a height of the first portion. A cutting edge extends along the second portion having a plurality of gullets and a plurality of teeth, the gullets having a width of between about 0.125 inches and about 0.255 inches across the cutting edge and the teeth having a tooth length between about 0.125 inches and about 0.325 inches.

The invention provides, in another aspect, a blade for use with a reciprocating saw. The blade includes an attachment portion configured to couple to the reciprocating saw and a body extending from the attachment portion. The body includes a first portion, a tip portion, a second portion extending from the first portion to the tip portion, and a cutting edge. The second portion has a height less than a height of the first portion. The blade also includes a blunt tip formed at a distal end of the tip portion and a plurality of gullets formed in the second portion. At least one of the gullets has a generally trapezoidal shape.

The invention provides, in another aspect, a blade for use with a reciprocating saw. The blade includes an attachment portion configured to couple to the reciprocating saw and a body extending from the attachment portion. The body includes a first portion, a tip portion, and a second portion extending from the first portion to the tip portion. The second portion has a height less than a height of the first portion. The blade also includes a blunt tip formed at a distal end of the tip portion and a plurality of teeth arranged along the second portion. At least one of the teeth includes a tooth length defining a cutting edge of the blade. The tooth length is between about 0.125 inches and about 0.325 inches.

The invention provides, in another aspect, a blade for use with a reciprocating saw. The blade includes an attachment portion configured to couple to the reciprocating saw and a body extending from the attachment portion. The body includes a first portion, a tip portion, and a second portion extending from the first portion to the tip portion. The second portion has a height less than a height of the first portion. The blade also includes a plurality of gullets formed in the second portion. At least one of the gullets is spaced from an adjacent gullet by a substantially flat toothless cutting edge.

Other features and aspects of the invention will become apparent by consideration of the following detailed description and accompanying drawings.

BRIEF DESCRIPTION OF THE DRAWINGS

FIG. 5 is a top view of a blade according to another embodiment of the invention.

FIG. 6A is a profile view of the blade shown in FIG. 5.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
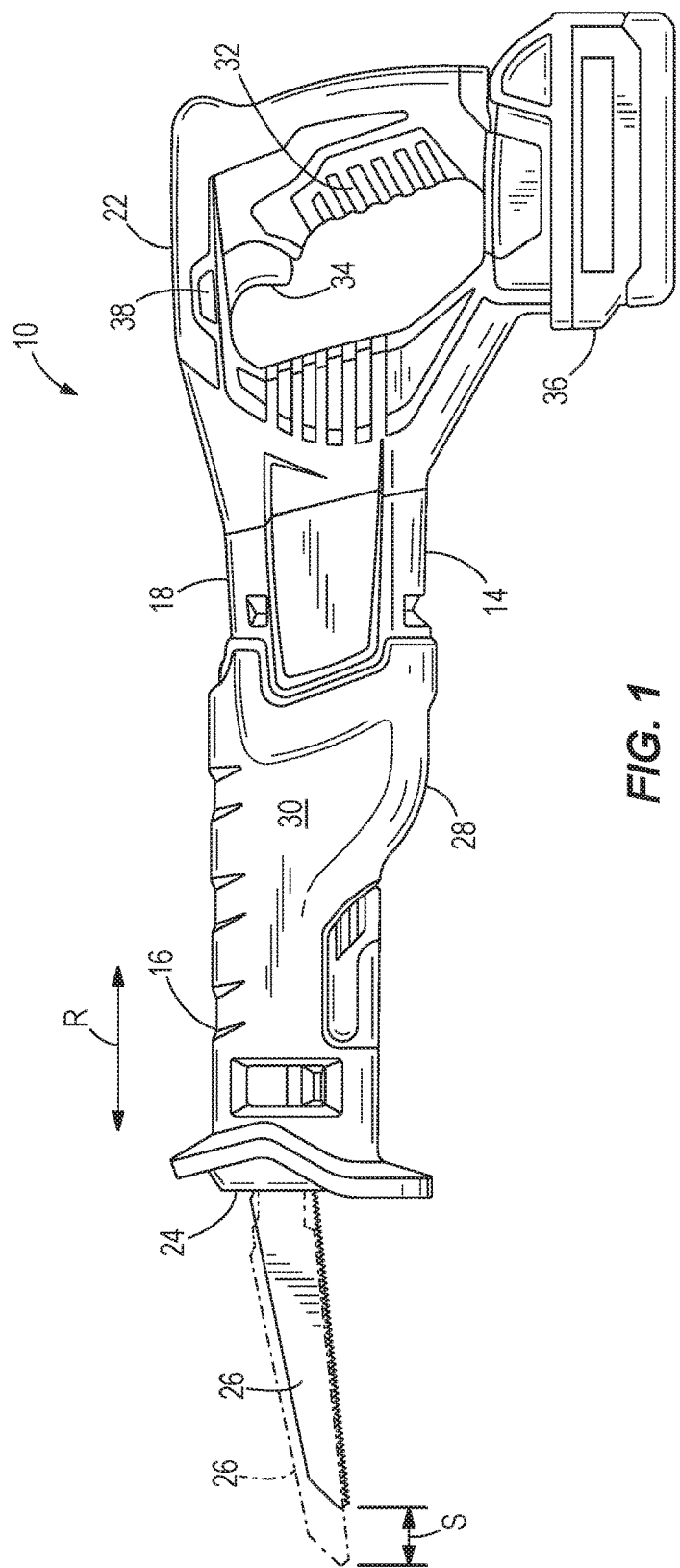
FIG. 1 is a side view of a reciprocating power tool for receiving a blade according to an embodiment of the invention, shown in FIG. 1 receiving a saw blade.
Figure 2:
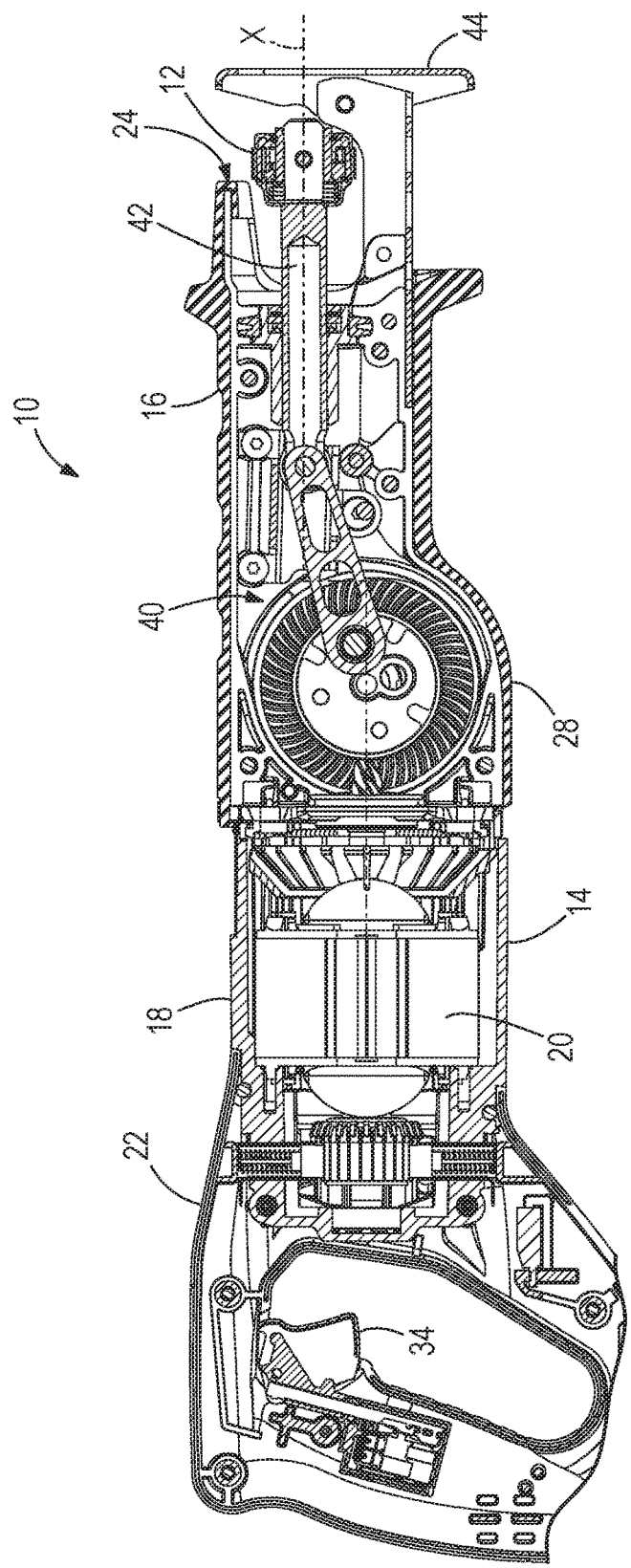
FIG. 2 is a cross-section of the reciprocating power tool shown in FIG. 1 and including a shoe.

FIGS. 1 and 2 illustrate a reciprocating power tool 10 including a blade clamp mechanism 12. The illustrated reciprocating power tool 10 is a reciprocating saw; however, in other embodiments, other reciprocating power tools may include the invention. As shown in FIGS. 1 and 2, the power tool 10 includes a saw housing 14 having a forward portion 16, a body portion 18 housing a motor 20 (FIG. 2), and a handle portion 22. The forward portion 16 of the saw housing 14 includes a blade receiving aperture or end 24 that receives a saw blade 26 (FIG. 1) or a blade 46 according to one embodiment (FIG. 3), a blade 46' according to another embodiment (FIG. 4), a blade 146 according to another embodiment (FIGS. 5-6B), or a blade 246 according to yet another embodiment (FIG. 7), as will be described in greater detail below. The saw blade 26 is releasably coupled to the blade clamp mechanism 12 (FIG. 2) positioned within the saw housing 14, specifically, within the receiving aperture 24. In the illustrated embodiment, a boot or grip portion 28 is positioned over the forward portion 16 of the saw housing 14. In this embodiment, the boot 28 provides a grip area 30 for a user of the power tool 10 and/or provides protection to the tool 10. In some embodiments, the boot 28 is over-molded onto the forward portion 16. The handle portion 22 includes an over-mold to define an ergonomic grip 32 and allows the user to hold and control the power tool 10.

With continued reference to FIGS. 1 and 2, the power tool 10 includes a trigger-type power switch 34 for activating a power supply 36 of the tool 10 and a button or switch 38 for selecting a speed level (e.g., a high speed or a low speed) for reciprocating the saw blade 26. In the illustrated embodiment, the power supply 36 is a rechargeable battery pack. The battery pack 36 is releasably coupled to the handle portion 22 to provide power to the power tool 10, and is releasable away from and rearward of the handle portion 22. In the illustrated embodiment, the battery pack 36 is an eighteen-volt (18V) rechargeable power tool battery pack. In other embodiments, the battery pack 36 may be a twelve-volt (12V), a twenty-four-volt (24V), or other various voltages. According to another embodiment, the power supply 36 may be an alternating current (AC) power provided via a corded plug electrically coupled to a wall outlet or any number of suitable powering options.

With reference to the cross section illustrated in FIG. 2, the reciprocating tool 10 also includes a drive mechanism 40 positioned substantially within the housing 14. The drive mechanism 40 is coupled to the motor 20 and to a spindle 42 for transferring rotational motion of a shaft of the motor 20 into reciprocating motion of the spindle 42 along a longitudinal axis X relative to the housing 14. The blade clamp mechanism 12 is disposed at a distal end of the spindle 42 for receiving the blade 26. The blade clamp mechanism 12 secures the blade 26 to the spindle 42 for reciprocation with the spindle 42 in a direction R (FIG. 1), which is substantially parallel to the longitudinal axis X. The magnitude of reciprocation of the spindle 42 is measured as a distance called the stroke length S, illustrated in FIG. 1 as the magnitude of reciprocation of the blade 26. Most reciprocating saws have a stroke length S of between about 1 inch and about 1.25 inches. Other reciprocating tools may have a smaller stroke length S of 0.5 inches or 0.75 inches, for example. In other embodiments, other suitable types and configurations of blade clamp mechanisms may be employed.

The reciprocating tool 10 also includes a removable shoe 44, illustrated in FIG. 2, operable to engage a work piece and provide stability to the tool 10 while cutting. The shoe 44 typically acts as a stop to limit the depth of the saw blade 26 into the workpiece and to prevent the workpiece from engaging the saw blade 26 at a connection of the saw blade 26 to the tool 10 (e.g., at the blade clamp mechanism 12). In some embodiments, the shoe 44 freely pivots about an axis to allow the user to adjust an angle at which the blade 26 engages the workpiece during a cut. In some embodiments, the reciprocating tool 10 may not include a shoe.

In other embodiments, the power tool 10 may include various handle constructions, drive mechanisms, blade clamp mechanisms, and power configurations. In further embodiments, the power tool 10 may include other types of power and speed control switches or may not include a speed control feature.

Figure 3:
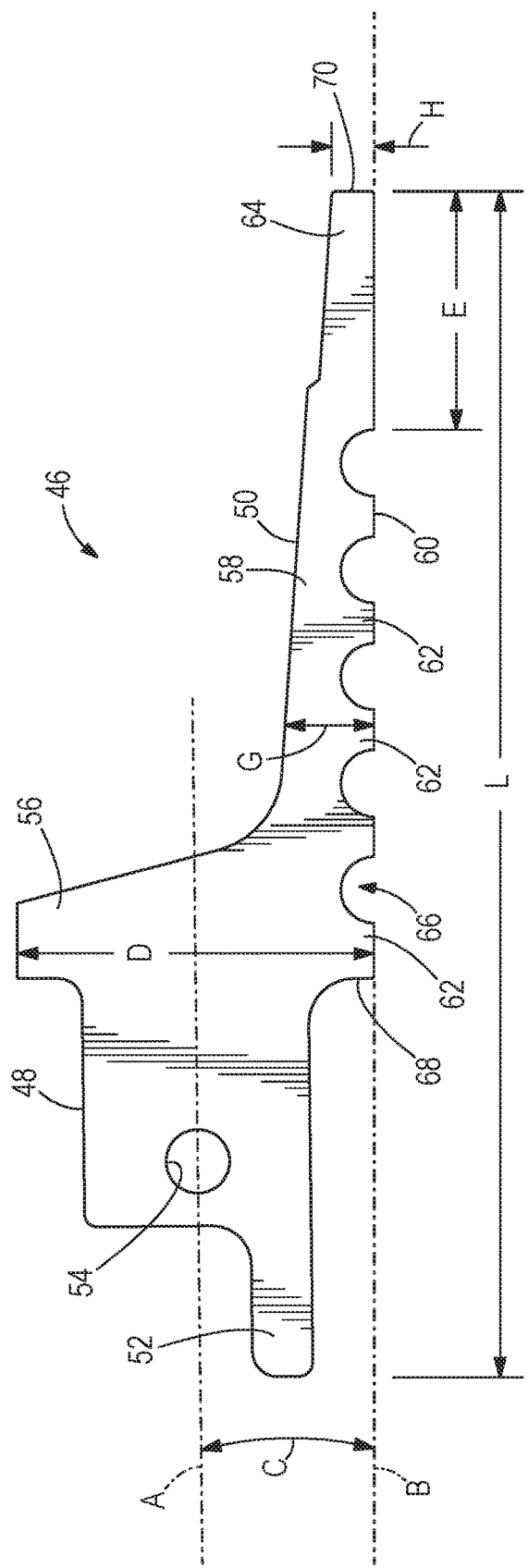
FIG. 3 is a profile view of a blade according to an embodiment of the invention.
Figure 4:
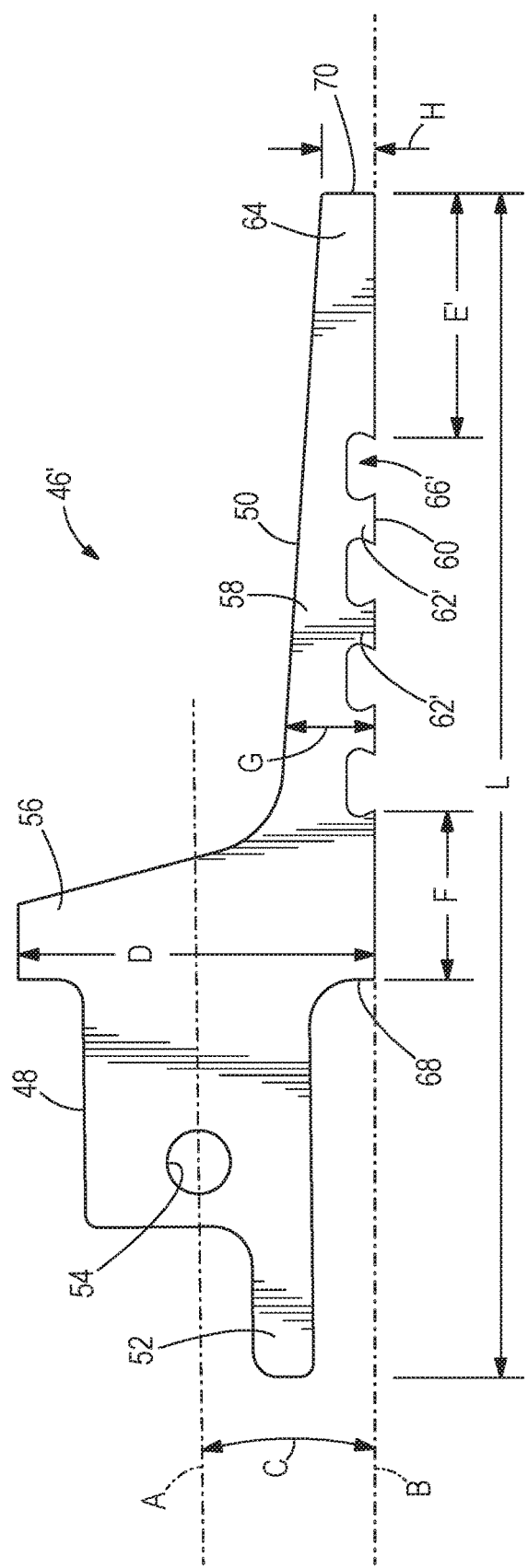
FIG. 4 is a profile view of a blade according to another embodiment of the invention.

FIGS. 3 and 4 illustrate the blades 46, 46' according to two embodiments of the invention. The blades 46, 46' are preferably formed from a bi-metal strip, or any hardened steel, and include an attachment portion 48 and a body 50 extending from the attachment portion 48. The attachment portion 48 includes a tang 52 and an aperture 54, which are configured to engage with the blade clamp mechanism 12 to securely and releasably connect the respective blades 46, 46' to the reciprocating tool 10. The attachment portion 48 defines a longitudinal axis A which, when attached to the blade clamp mechanism 12, is substantially parallel to the longitudinal axis X of reciprocation of the spindle 42. In some embodiments, the longitudinal axis A is coincident with the longitudinal axis X when the blades 46, 46' are attached to the blade clamp mechanism 12. In other embodiments, other types or configurations of attachment portions may be employed in order to suit the blade clamp mechanism 12 of the reciprocating tool 10. In yet other embodiments, other suitable materials may be used to form the blades 46, 46'. In the illustrated embodiments, the body 50 is formed as one piece with the attachment portion 48. In other embodiments, fasteners or fastening means may be employed, such as rivets, screws, bolts, glue, adhesives, welding, soldering, and the like.

The body 50 includes a transition portion 56 extending from the attachment portion 48, a low profile portion 58 extending from the transition portion 56, and a cutting edge 60 extending across the transition portion 56 and the low profile portion 58. The transition portion 56 is sloped steeply to transition from a height D to a relatively low height G of the low profile portion 58. The cutting edge 60 extends substantially along a cutting plane B and may include a carbide grit coating. In the illustrated embodiment, the attachment portion 48 (e.g., the axis A) is substantially parallel to the cutting edge 60 (and the cutting plane B). In other embodiments, the axis A and the cutting edge 60 are offset by a tang angle C. The tang angle C is preferably between about 0 degrees and about 5 degrees. As mentioned, the tang angle C is about 0 degrees in the illustrated embodiment.

In the embodiments illustrated in FIGS. 3 and 4, the cutting edge 60 includes teeth 62, 62' and gullets 66, 66'. FIG. 3 illustrates a first toothform defined by teeth 62 and gullets 66 having a circular segment shape. The spacing between gullets 66 is driven by the stroke length S of the reciprocating tool 10; at a minimum, individual gullets 66 are spaced from each other by the material thickness of the body 50. The transition portion 56 and the low profile portion 58 include the gullets 66. The gullets 66 begin adjacent a proximal edge 68 of the transition portion 56 such that a first tooth 62 is defined at the proximal edge 68 of the transition portion 56. The gullets 66 end at a distance E spaced from a distal end 70 of the low profile portion 58. The distance E is at least greater than the length of a tooth 62 measured in a direction parallel to the cutting plane B as shown in FIG. 3. If all the gullets 66 are used to cut drywall (or other material), the distance E preferably has a length of about 0.26 inches to about 0.71 inches. In the illustrated embodiment, five gullets 66 and five teeth 62 are employed. In other embodiments, the gullets 66 and teeth 62 may be spaced differently and fewer or more teeth 62 and gullets 66 may be employed. Furthermore, in other embodiments, other toothforms and gullet shapes and sizes may be employed.

For example, FIG. 4 illustrates the blade 46' having a second toothform defined by teeth 62' and gullets 66'. The gullets 66' have an elongated rectangular shape with rounded ends, or an oval shape. The gullets 66' are spaced from each other by less than a length of a single gullet 66'. The gullets 66' begin at a distance F spaced from the proximal edge 68 of the transition portion 56. If all the gullets 66' are used to cut drywall (or other material), the distance F preferably has a length of about 0.32 inches to about 0.77 inches. Furthermore, the transition portion 56 does not include the gullets 66'. The gullets 66' begin in the low profile portion 58 and end at a distance E' spaced from the distal end 70 of the low profile portion 58. The distance E' is at least greater than the length of a tooth 62' measured in a direction parallel to the cutting plane B as shown in FIG. 4. If all the gullets 66' are used to cut drywall (or other material), the distance E' preferably has a length of about 0.26 inches to about 0.71 inches. In the illustrated construction, four gullets 66' and three teeth 62' are employed. In other embodiments, the gullets 66' and teeth 62' may be spaced differently and fewer or more teeth 62' and gullets 66' may be employed. Furthermore, in other embodiments, other toothforms and gullet shapes and sizes may be employed. Other embodiments include additional gullets 66, 66' such that the distances E, E', and F are less than the above-noted ranges (for example, E=E'=F=0). The presence of additional gullets 66, 66', which causes the distances E, E', and F to fall outside of the above-noted ranges, serves a decorative function, increases the cut speed of a reciprocating saw, and helps clean up the cut made by the blades 46, 46'.

The blades 46, 46' terminate in a blunt tip 64 located adjacent the cutting teeth 62 at a distal end of the cutting edge 60. The low profile portion 58 includes the blunt tip 64, which is squared off to prevent disadvantageous cutting of material, such as wires, located behind a workpiece, such as drywall, as will be described in greater detail below. In other embodiments, the blunt tip 64 may have other blunt shapes, such as a curved or rounded shape, a wide triangular shape or the like. The blunt tip 64 includes a tip height H of between about 0.062 inches and about 0.125 inches.

The blades 46, 46', and more specifically, the body 50, have a material thickness of about 0.035 inches to about 0.080 inches. The overall length L of the blades 46, 46' is between about 2.5 inches and about 3.25 inches. In the illustrated embodiments, the overall length L of the blade 46, 46' is about 2.5 inches. The height G of the low profile portion 58 is between about 0.1875 inches and about 0.25 inches.

The blades 46, 46' are particularly well-suited for cutting drywall. In operation, a user attaches one of the blades 46, 46' to the blade clamp mechanism 12 of the reciprocating power tool 10 and positions the shoe 44 against the surface of the drywall. Due to the length L of the blades 46, 46' (which is shorter than most conventional blades) with respect to the stroke length S of the reciprocating tool 10, the blades 46, 46' fully exit the drywall on the back stroke, and the blunt tip 64 plunges back into the drywall on the forward stroke (e.g., a sewing needle effect). The length L of the blades 46, 46' is about 2.5 inches and the stroke length S of the power tool 10 is about 1.125 inches. Therefore, the ratio of the blade length L to the stroke length S is about 2.22. In other embodiments, the ratio is between about 2 (e.g., a blade length L of 2.5 inches and a stroke length S of 1.25 inches). In other embodiments, the ratio is about 3.25 (e.g., a blade length L of about 3.25 inches and a stroke length S of about 1 inch). In some embodiments, the blade 46, 46' may not completely exit the drywall on the backstroke (e.g., when the blade length L is particularly long and the stroke length S is particularly short). The short height H of the blunt tip 64 also aids the sewing needle effect, allowing the blades 46, 46' to puncture a new location on the drywall on each stroke without blowing out the paper on the back side of the drywall.

When the sewing needle effect is present, the blunt tip 64 substantially performs the cut in the drywall by puncturing the drywall repeatedly. As such, the blades 46, 46' can cut through the drywall in all directions parallel to the drywall (e.g., to cut a rectangle for an electrical outlet) while the user maintains the reciprocating power tool 10 in a single orientation (e.g., substantially parallel to the floor). In other words, the user need not turn the power tool 360 degrees about the reciprocating axis X in order to cut a complete aperture in the drywall. Furthermore, the blunt tip 64 is less likely to cut electrical wires, pipes, and other important features located in close proximity behind the drywall compared with a conventional long, sharp blade. In some uses, in which the sewing needle effect is not present and the blades 46, 46' remain in the drywall during reciprocation, the cutting edge 60 is used to remove material on both the forward and backward strokes of the tool. The gullets 66, 66', i.e., the space between the teeth 62, 62', collect and remove bits of drywall. In such embodiments, the cut zone is located substantially in the low profile portion 58 of the blade 46, 46'.

Figure 6B:
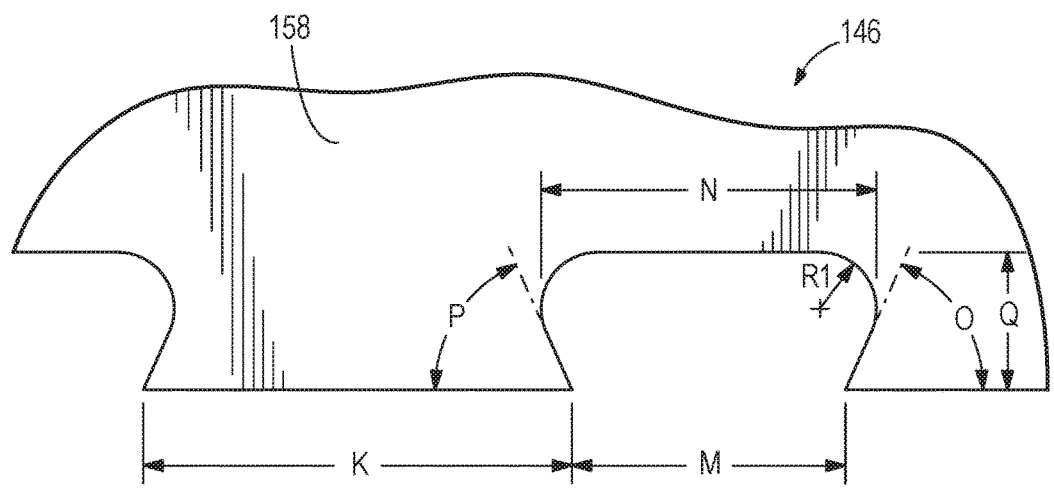
FIG. 6B is an enlarged view of a portion of the blade shown in FIG. 6A.

FIGS. 5-6B illustrate a blade 146 according to another embodiment of the invention. The blade 146 of FIGS. 5-6B is similar to the blades 46, 46' of FIGS. 3 and 4; therefore, like structures will be identified by like reference numerals plus 100 and only the differences will discussed hereafter.

The blade 146 includes a body 150 having a length L. The length L is preferably about 2.5 inches, but may include a length of between about 2.4 inches and about 2.8 inches. The body 150 includes a second cutting edge 160' that extends substantially along a second cutting plane B', which are substantially parallel to cutting edge 160 and cutting plane B, respectively. The cutting edge 160' may also include a carbide grit coating. The blade 146 has teeth 162 and gullets 166 cut from a bottom surface 172 of the body 150, which is defined by the cutting edge 160, and teeth 162' and gullets 166' cut from a top surface 172' of the blade body 150, which is defined by the second cutting edge 160'. The distance between the surface 172, 172' (and the cutting edges 160, 160') is defined as the height G. In the illustrated embodiment, the height G of low profile portion 158 is substantially the same as a height H of a tip 176, but may be different in other embodiments.

The low profile portion 158 extends from transition portion 156 to a distal end 170. In the illustrated embodiment, the distal end includes the tip 176 with a chisel feature. As such, a first side 178 of the blade 146 includes a beveled portion 180 on the distal end 170 defining the tip 176. Further embodiments may include a tip 176 having other configurations. The low profile portion 158 has a greater height G than the embodiments of FIGS. 3 and 4 in order to accommodate a depth (which will be described in greater detail below) of the gullets 166, 166' on both the first and second surfaces 172, 172'. The transition portion 156 has a slope that transitions from the height D to the height G of the low profile portion 158 of the blade 146, which is less steep than the transition illustrated in FIGS. 3 and 4.

In the illustrated embodiment, the height D is about 0.75 inches and the height H (and therefore also the height G) is about 0.25 inches. The height D of the transition portion is preferably between about 0.625 inches to about 1.0 inches. Additionally, the height H of the distal end 170 (and, therefore, the height G of the low profile portion 158) is preferably between about 0.18 inches and about 0.25 inches. In the illustrated embodiment, the attachment portion 148 (along the axis A) is substantially parallel to the cutting edges 160, 160', and thereby the cutting planes B, B'. In other embodiments, the axis A and the cutting edges 160, 160' are offset by a tang angle C. The tang angle C is preferably between about 0 degrees and about 5 degrees. As mentioned, the tang angle C is about 0 degrees in the illustrated embodiment.

Further with respect to FIGS. 5-6B, the teeth 162, 162' and gullets 166, 166' define a toothform, which is illustrated in the enlarged view of FIG. 6B. The gullets 166, 166' have a substantially trapezoidal shape with rounded corners having a radius R1. The radius R1 is preferably between about 0.01 and about 0.04 inches. In the illustrated embodiment, the radius R1 is about 0.025 inches. The openings 174 of the gullets 166, 166' define the narrowest point of the gullets 166, 166'. The openings 174 are defined by width M measured parallel to the cutting edge 160, 160', which has a preferred value of about 0.125 inches, but may be within a range of about 0.12 inches and about 0.25 inches. The widest part of the gullets 166, 166' is measured by a width N in a direction parallel to the cutting edge 160, 160'. The width N is preferably between about 0.125 and about 0.255 inches. In the illustrated embodiment, the width N is about 0.18 inches. The gullets 166, 166' are spaced apart from each other by distance K (which is also the tooth length), which has a preferred value of about 0.200 inches, but may be within a range of about 0.125 inches and about 0.325 inches. Each tooth 162, 162' has a tooth height Q (or gullet depth) of preferably between about 0.035 and about 0.080 inches. In the illustrated embodiment, the tooth height Q is about 0.062 inches. Also, each tooth 162, 162' defines a first angle O and a second angle P, each with respect to the corresponding cutting edge 160, 160'. The first angle O is preferably between about 45 and about 85 degrees. In the illustrated embodiment, the first angle O is about 65 degrees. The second angle P is preferably between about 45 and about 85 degrees. In the illustrated embodiment, the second angle P is about 65 degrees.

In the illustrated embodiment, the blade 146 includes gullets 166w, 166x, 166y, 166z along the cutting edge 160 and gullets 166x', 166y', 166z' along the cutting edge 160'. Referring to FIG. 6A, the gullets 166x', 166y', 166z' are substantially aligned longitudinally with the gullets 166x, 166y, 166z (i.e., the gullets 166, 166' are opposed in an unstaggered configuration). The gullets 166 begin at a distance F spaced from the distal edge 168 of the transition portion 156, while the gullets 166' begin at a distance F' from the distal edge 168 (the distance F' is about the sum of the distance F, the width of one tooth 162 (distance K), and the width one gullet 166 (distance M)).

The spacing between gullets 166, 166' is driven by the stroke length of the reciprocating tool 10; at a minimum, individual gullets 166, 166' are spaced from each other by the material thickness of the body 150. If all the gullets 166, 166' are used to cut drywall (or other material), the distance F preferably has a length of about 0.406 inches, but may be in the range of about 0.32 inches to about 0.77 inches. Furthermore, the transition portion 156 does not include the gullets 166, 166'. In the embodiment illustrated in FIGS. 5-6B, the gullets 166, 166' begin in the low profile portion 158 and end at a distance E spaced from the distal end 170 of the low profile portion 158. The preferred distance E is about 0.150 inches, but may be within a range of about 0.062 inches and about 0.300 inches. In the illustrated embodiment, four gullets 166 and three teeth 162 are employed along cutting edge 160, while three gullets 166' and two teeth 162' are employed along cutting edge 160'. In other embodiments, the gullets 166, 166' and teeth 162, 162' may be spaced differently and fewer or more gullets 166, 166' and teeth 162, 162' may be employed.

It is contemplated that further embodiments may include alternative unstaggered configurations. For example, the gullets 166x', 166y', 166z' may be aligned with the gullets 166w, 166x, 166y. Further, the illustrated embodiment includes an unstaggered configuration having three of the four gullets 166 along the cutting edge 160 aligned with all three gullets 166' along the cutting edge 160'. However, additional embodiments may include fewer or more gullets 166, 166' along the cutting edges 160, 160' having any suitable unstaggered configuration where fewer or more of the gullets 166, 166' are aligned. Furthermore, in other embodiments, other toothforms and gullet shapes and sizes may be employed. Other embodiments include additional gullets 166, 166' such that the distances E, F, and F' are less than the above-noted ranges (for example, E=E'=F=0).

Figure 7:
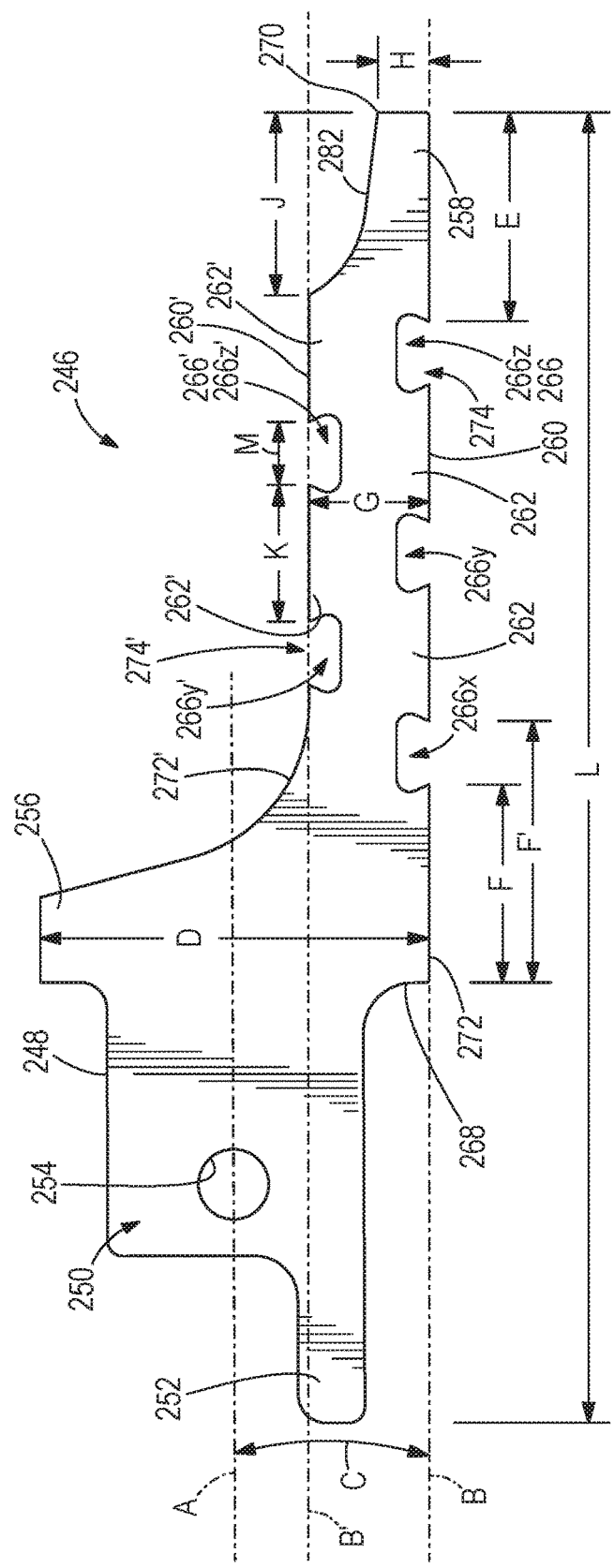
FIG. 7 is a profile view of a blade according to another embodiment of the invention.

FIG. 7 illustrates a blade 246 according to yet another embodiment of the invention. The blade 246 of FIG. 7 is similar to the blades 146 of FIGS. 5 and 6; therefore, like structures will be identified by like reference numerals plus 100 and only the differences will discussed hereafter.

The blade 246 has teeth 262 and gullets 266, which extend on a first surface 272 of the body 250 and teeth 262' and gullets 266' that extend on a second surface 272' of the blade body 250. Low profile portion 258 extends from transition portion 256 to a distal end 270. The transition portion 256 has a slope that transitions from a height of D to a height of G of the low profile portion 258. The height G of the low profile portion 258 is constructed to accommodate a depth of the gullets 266, 266' (as described above) on both the first and second surfaces 272, 272' and therefore, corresponds to a preferred height of about 0.23 inches, but may be within a range of about 0.18 inches to about 0.25 inches. The blade 246 includes a second transition portion 282 having a slope that transitions from a height of G to a height of H at the distal end 270 over a length J. The preferred height of H is about 0.10 inches, but may be within a range of about 0.062 inches and about 0.125 inches. The preferred length J is about 0.35 inches although the length may be in a range of about 0.30 inches to about 0.38 inches.

Further with respect to FIG. 7, there are three gullets 266x, 266y, 266z on the cutting edge 260 and two gullets 266y', 266z' on the cutting edge 260'. In the illustrated embodiment, the gullets 266y', 266z' are offset longitudinally from the gullets 266x, 266y, 266z (i.e., the gullets 266, 266' are in a staggered configuration). As such, a gullet 266' is located between adjacent gullets 266. In the illustrated embodiment, a width M of the openings 274 of the gullets 266, 266' are more narrow than a width K of the teeth 262, 262'; further embodiments may include width M that is wider than or substantially equal to width K. The preferred widths M and K are about 0.120 inches and about 0.26 inches, respectively; however, the width M may have a range between about 0.12 inches and about 0.25 inches, while the width K may have a range between about 0.125 inches and about 0.325 inches.

The gullets 266 begin at a distance F spaced from the proximal edge 268 of the transition portion 256, while the gullets 266' begin at a distance F' from the proximal edge 268 (the distance F' is about the sum of the distance F and substantially the width of one tooth 262 (distance K)). The spacing between gullets 266, 266' is driven by the stroke length of the reciprocating tool 10; at a minimum, individual gullets 266, 266' are spaced from each other by the material thickness of the body 250. If all the gullets 266, 266' are used to cut drywall (or other material), the distance F preferably has a length of about 0.406 inches, but may be in the range of about 0.32 inches to about 0.77 inches. Furthermore, the transition portion 256 does not include the gullets 266, 266'.

In the embodiment illustrated in FIG. 7, the gullets 266, 266' begin in the low profile portion 258. The gullets 266 end at a distance E spaced from the distal end 270 of the low profile portion 258, while gullets 266' end at a distance that is about equal to the sum of the width of E and the width K of a single tooth 262'. The distance between the second transition portion 282 and the end of the gullets 266' may be any suitable length. The distance E is at least greater than the length of a tooth 262, 262' measured in a direction parallel to the cutting planes B, B' as shown in FIG. 7.

In the illustrated embodiment, three gullets 266 and two teeth 262 are employed along cutting edge 260, while two gullets 266' and two teeth 262' are employed along cutting edge 260'. In other embodiments, the gullets 266, 266' and teeth 262, 262' may be spaced differently and fewer or more gullets 266, 266' and teeth 262, 262' may be employed. It is contemplated that further embodiments may include alternative staggered configurations where fewer or more of the gullets 266, 266' are staggered. In other embodiments, the gullets 266, 266' may be aligned. Furthermore, in other embodiments, other toothforms and gullet shapes and sizes may be employed. Other embodiments include additional gullets 266, 266' such that the distances E, F, F', K, J and M are less than the above-noted ranges (for example, E=E'=F=0).

Thus, the invention provides, among other things, a blade attachable to a reciprocating saw for making cuts in drywall without cutting objects behind the drywall and without having to turn the reciprocating saw. Various features of the invention are set forth in the following claims.

What is claimed is:

1. A blade for use with a reciprocating saw, the blade comprising:
    an attachment portion configured to couple to the reciprocating saw;
    a body extending from the attachment portion and including a first portion, a tip portion, and a second portion extending from the first portion to the tip portion, wherein the first portion has a height between about 0.625 inches and about 1.0 inches and the second portion has a height between about 0.18 inches and about 0.25 inches;
    a blunt tip formed at a distal end of the tip portion, wherein the blade includes an overall length between about 2.4 inches and about 3.25 inches, measured from a proximal edge of the attachment portion to the blunt tip; and
    a plurality of teeth arranged along the second portion;
    wherein the blade includes an axis in which it reciprocates in use, the plurality of teeth each having a flat cutting edge parallel to the axis.

2. The blade of claim 1, further comprising a transition portion of the body extending between the first portion and the second portion, the transition portion being sloped steeply between the height of the first portion and the height of the second portion.

3. The blade of claim 1, wherein the tip portion includes a tip height between about 0.062 inches and about 0.125 inches, measured substantially perpendicular to the cutting edge.

4. The blade of claim 1, wherein the plurality of teeth includes an upper tooth formed in an upper surface of the second portion and a lower tooth formed in a lower surface of the second portion.

5. The blade of claim 4, wherein the upper tooth and the lower tooth are substantially aligned in a direction substantially parallel to the axis.

6. The blade of claim 4, wherein the upper tooth and the lower tooth are offset from one another in a direction substantially parallel to the axis.

7. The blade of claim 1, wherein at least one of the plurality of teeth defines a first angle between about 45 degrees and about 85 degrees, measured between the flat cutting edge and a front edge of the at least one tooth, and wherein the at least one tooth defines a second angle between about 45 degrees and about 85 degrees, measured between the flat cutting edge and a rear edge of the at least one tooth.

8. The blade of claim 1, wherein the blunt tip includes a bevel defining a chisel feature.

9. The blade of claim 1, wherein the blade includes an overall length of about 2.5 inches, measured parallel to the axis from a proximal edge of the attachment portion to the blunt tip.

10. The blade of claim 1, wherein at least one of the plurality of teeth includes a tooth length between about 0.125 inches and about 0.325 inches.

11. The blade of claim 10, wherein the tooth length is about 0.2 inches.

12. The blade of claim 10, wherein the tooth length is about 0.26 inches.

13. A blade for use with a reciprocating saw, the blade comprising:
    an attachment portion configured to couple to the reciprocating saw;
    a body extending from the attachment portion and including a first portion, a tip portion, and a second portion extending from the first portion to the tip portion, wherein the second portion has a height less than a height of the first portion; and
    the second portion having a plurality of gullets and a plurality of teeth, the teeth each having a flat cutting edge parallel to an axis in which the blade reciprocates in use, the gullets having a width of between about 0.125 inches and about 0.255 inches parallel to the axis and the teeth having a tooth length between about 0.125 inches and about 0.325 inches parallel to the axis.

14. The blade of claim 13, wherein the plurality of gullets includes an upper gullet formed in an upper surface of the second portion and a lower gullet formed in a lower surface of the second portion.

15. The blade of claim 14, wherein the upper gullet and the lower gullet are substantially aligned in a direction substantially parallel to the axis.

16. The blade of claim 14, wherein the upper gullet and the lower gullet are offset from one another in a direction substantially parallel to the axis.

17. The blade of claim 13, wherein at least one of the plurality of gullets includes two rounded corners, the two rounded corners including a radius between about 0.01 and about 0.04 inches.

18. The blade of claim 13, wherein at least one of the plurality of gullets includes a gullet depth between about 0.035 and about 0.080 inches.

19. The blade of claim 13, wherein the height of the first portion is between about 0.625 inches and about 1.0 inches, measured substantially perpendicular to the axis.

20. The blade of claim 19, wherein the height of the second portion is between about 0.18 inches and about 0.25 inches, measured substantially perpendicular to the axis.

21. The blade of claim 20, wherein the tip portion includes a tip height between about 0.062 inches and about 0.125 inches, measured substantially perpendicular to the axis.

22. The blade of claim 20, wherein the tip portion includes a tip height between about 0.18 inches and about 0.25 inches, measured substantially perpendicular to the axis.

23. The blade of claim 13, wherein the blade includes an overall length between about 2.4 inches and about 3.25 inches, measured substantially parallel to the axis from a proximal edge of the attachment portion to the blunt tip.

24. The blade of claim 13, wherein the first portion includes another flat cutting edge.

25. The blade of claim 24, wherein the first portion does not include a gullet.

\* \* \* \* \*